United States Patent [19]
Vitunic

[11] Patent Number: 5,793,168
[45] Date of Patent: Aug. 11, 1998

[54] ACTIVE DECELERATION CIRCUIT FOR A BRUSHLESS DC MOTOR

[75] Inventor: Mark R. Vitunic, San Jose, Calif.

[73] Assignee: Micro Linear Corporation, San Jose, Calif.

[21] Appl. No.: 697,366

[22] Filed: Aug. 23, 1996

[51] Int. Cl.$^6$ ...................................................... H02P 6/24
[52] U.S. Cl. ........................... 318/254; 318/373; 318/703
[58] Field of Search ................................. 318/138, 254, 318/373, 375, 430, 431, 439, 700, 703

[56] References Cited

U.S. PATENT DOCUMENTS

| | | | |
|---|---|---|---|
| 3,649,845 | 3/1972 | Foch | 307/228 |
| 3,736,488 | 5/1973 | Abraham et al. | 318/696 |
| 4,008,421 | 2/1977 | Bird | 318/171 |
| 4,101,821 | 7/1978 | Kirby | 323/119 |
| 4,223,261 | 9/1980 | White | 318/721 |
| 4,482,961 | 11/1984 | Kilner et al. | 364/428 |
| 4,618,787 | 10/1986 | Jacksier et al. | 307/591 |
| 4,680,526 | 7/1987 | Okuyama et al. | 318/802 |
| 4,806,880 | 2/1989 | Laws | 331/8 |
| 4,825,132 | 4/1989 | Gritter | 318/811 |
| 4,841,251 | 6/1989 | Hartmann et al. | 328/36 |
| 4,866,397 | 9/1989 | Kimyacioglu | 330/252 |
| 4,928,043 | 5/1990 | Plunkett | 318/254 |
| 4,949,364 | 8/1990 | Yukawa | 377/28 |
| 4,962,339 | 10/1990 | Schauder | 318/798 |
| 4,962,344 | 10/1990 | Bohrer | 307/260 |
| 5,032,771 | 7/1991 | Kerman et al. | 318/52 |
| 5,066,899 | 11/1991 | Nashiki | 318/807 |
| 5,111,085 | 5/1992 | Stewart | 307/603 |
| 5,111,150 | 5/1992 | Casey | 328/155 |
| 5,132,599 | 7/1992 | Kono et al. | 318/618 |
| 5,172,036 | 12/1992 | Cameron | 318/138 |
| 5,187,419 | 2/1993 | DeLange | 318/805 |
| 5,206,543 | 4/1993 | Takita et al. | 307/352 |
| 5,218,283 | 6/1993 | Wills et al. | 318/748 |
| 5,231,339 | 7/1993 | Kishimoto et al. | 318/807 |
| 5,247,237 | 9/1993 | Koyama et al. | 318/808 |
| 5,252,905 | 10/1993 | Wills et al. | |
| 5,278,486 | 1/1994 | Kim | 318/811 |
| 5,304,911 | 4/1994 | Anderson | 318/729 |
| 5,334,923 | 8/1994 | Lorenz et al. | 318/805 |
| 5,345,160 | 9/1994 | Corniere | 318/811 |
| 5,376,866 | 12/1994 | Erdman | 318/254 |
| 5,410,188 | 4/1995 | Segaram | 327/237 |
| 5,428,285 | 6/1995 | Koyama et al. | 318/799 |
| 5,451,832 | 9/1995 | Cameron et al. | 318/375 |

OTHER PUBLICATIONS

Gottlieb, I. M., *Electric Motors & Control Techniques*, 2nd Ed., pp.147–149, 235–247, TAB Books, 1994.

*Primary Examiner*—Bentsu Ro
*Attorney, Agent, or Firm*—Haverstock & Associates

[57] ABSTRACT

A circuit for driving a brushless dc motor includes an active deceleration circuit for rapidly slowing the motor. A phase locked loop senses a position of the rotor for commutating from a drive state to a next drive state in a sequence of drive states at an appropriate time for maintaining torque on the rotor in the direction of rotation. Thus, the rotor "chases" the energized windings. A speed control loop controls current in the windings and, thus, motor speed. When the speed of the motor exceeds a desired speed by more than a threshold amount, rather than commutating to a next drive state in the sequence, the circuit skips a commutation. By skipping one commutation, the current drive state is maintained while the rotor continues to turn, due to its own inertia, such that the rotor "passes up" the current drive state. This results in a torque on the rotor in a direction opposite rotation. When the phase locked loop indicates an appropriate time for commutating to a next drive state, the circuit transitions to the next drive state in the sequence. Therefore, the current drive state continues to remain one commutation behind the normally appropriate drive state, maintaining the reverse torque. Accordingly, during deceleration, the energized windings "chase" the rotor. When the rotor slows sufficiently, the energized windings will "catch up" to the rotor such that the current drive state will be the appropriate drive state for again inducing a torque on the rotor in the direction of rotation.

27 Claims, 7 Drawing Sheets

ACTIVE DECELERATION CIRCUIT FOR A BRUSHLESS DC MOTOR

FIELD OF THE INVENTION

The invention relates to the field of control circuits for brushless dc motors. In particular, the invention relates to control circuits for brushless dc motors that selectively apply a braking torque to slow the motor.

BACKGROUND OF THE INVENTION

Electric motors are generally of the alternating current variety or of the direct current variety. Direct current motors are used extensively due to their ability to operate from a dc supply and due to having favorable speed control, torque and starting characteristics.

Direct current motors generally include a rotor having a shaft, a number of conductive windings coupled to the shaft, a stator having a bearing for allowing the shaft to rotate relative to the stator and a number of magnetic poles positioned around the rotor. When a voltage is applied to the windings, current flows in the windings which generates a magnetic field about the windings. The generated magnetic field interacts with the magnetic poles of the stator causing a rotational torque to be applied to the rotor. Conventional direct current motors include a split-ring commutator to switch the direction of current flow in the windings as the rotor rotates so that the direction of the generated field appropriately corresponds to the magnetic poles of the stator. This switching results in the generated torque continuously having a single angular direction. Otherwise, the motor would stop when the generated magnetic field aligned with the poles of the stator, failing to complete a revolution.

The commutator includes two or more conductive segments fixed to the shaft and connected to the windings. Two or more conductive brushes fixed to the stator connect the supply voltage to the windings by sliding along the commutator segments as the rotor turns. When the rotor is at an appropriate angle relative to the stator, the brushes simultaneously break contact with one segment and, then, make contact with a next segment, thus changing the direction of current flow in the windings such that the direction of the generated magnetic field appropriately corresponds to the magnetic poles of the stator for creating a continuous torque on the rotor.

Unfortunately, the commutator suffers from drawbacks. For example, due to the mechanical contact, the commutator segments and brushes can become worn, causing inefficient motor operation and requiring frequent servicing. In addition, as the motor rotates, the generated magnetic field interacts with the magnetic poles of the stator to shift the effective field of the magnetic poles. The amount of shift varies with the operating conditions of the motor. Thus, the commutator will not always switch the direction of the current flow in the windings at precisely the appropriate time. This can also cause inefficient operation of the motor and can cause sparking which can damage the commutator segments and brushes.

The demand for direct current motors, however, remains high as they find application in a variety of settings, such as in industrial processes, home appliances and automobiles. For example, a contemporary automobile may have ten or more direct current motors operating fans, wipers, electric windows, electric seat adjusters, etc. With solid state electronics having high power ratings, the switching function of conventional mechanical commutators can be replaced with electronic circuits. Direct current motors which do not have mechanical commutators, known as brushless dc motors, are available for use with such circuits.

Brushless dc motors generally have a permanent magnet as a rotor and a number of switchable windings coupled to the stator. Electric fields are generated by sequentially switching current in the windings such that the rotor "chases" the magnetic fields. The position or phase of the rotor, however, must be sensed in order to switch the current in the stator windings at the appropriate times.

FIG. 1 illustrates a schematic diagram of a three-phase brushless dc motor 100. The motor 100 has three terminals $\phi1$, $\phi2$ and $\phi3$, corresponding to each of the three phases $\phi1$, $\phi2$ and $\phi3$ of the motor. The motor 100 includes three windings L1, L2 and L3, where each winding is coupled across two of the three motor terminals. The windings L1, L2 and L3, together schematically form a triangle or delta ($\Delta$) as shown in FIG. 1. In the center of the triangle, the magnetic rotor R of the motor 100 is illustrated as a magnet having a north magnetic pole N and a south magnetic pole S. It will be understood that the rotor R can include more poles.

The brushless dc motor 100 can also be illustrated by an equivalent circuit where a first terminal of each winding L1, L2 and L3, are coupled together and a second terminal of each winding is coupled to each of the three motor terminals $\phi1$, $\phi2$ and $\phi3$. Thus, the windings L1, L2 and L3, schematically form a "Y".

FIG. 2 illustrates waveforms for each of the three phases $\phi1$, $\phi2$ and $\phi3$, and corresponding drive states for the three-phase brushless dc motor 100 shown in FIG. 1. Because the motor has three phases $\phi1$, $\phi2$ and $\phi3$, it has six possible drive states A–F. In drive state A, a positive voltage is applied to the terminal $\phi3$ and a negative voltage is applied to the terminal $\phi1$, while the terminal $\phi2$ floats. In the drive state B, a positive voltage is applied to the terminal $\phi3$ and a negative voltage is applied to the terminal $\phi2$, while the terminal $\phi1$ floats. In the drive state C, a positive voltage is applied to the terminal $\phi1$ and a negative voltage is applied to the terminal $\phi2$, while the terminal $\phi3$ floats. In the drive state D, a positive voltage is applied to the terminal $\phi1$ and a negative voltage is applied to the terminal $\phi3$, while the terminal $\phi2$ floats. In the drive state E, a positive voltage is applied to the terminal $\phi2$ and a negative voltage is applied to the terminal $\phi3$, while the terminal $\phi1$ floats. In the drive state F, a positive voltage is applied to the terminal $\phi2$ and a negative voltage is applied to the terminal $\phi1$, while the terminal $\phi3$ floats. After the drive state F, the sequence repeats beginning with the drive state A.

As the rotor R turns, the voltages shown in FIG. 2 are sequentially applied to the windings L1, L2 and L3, according to each of the drive states A–F to generate electric fields about the windings L1, L2 and L3. The rotor R then "chases" the generated electric fields, turning the shaft of the motor 100. The drive states must switch at appropriate times according to the position or phase of the rotor R, while the amount of current in the windings L1, L2 and L3, controls the motor torque and, thus, its speed.

A schematic block diagram of a prior art circuit for driving the three-phase brushless dc motor 100 is shown in FIG. 3. Referring to FIG. 3, a phase detect circuit 101 senses the position or phase of the rotor R and generates a corresponding voltage at its output. A voltage controlled oscillator 102 generates a clock signal where the frequency of the clock signal is based upon the level of the voltage generated by the phase detect circuit 101. A finite state machine 103 generates control signals for each of the six drive states A–F for controlling six drivers 104. The finite state machine transitions from one of the six drive states A–F to a next drive state upon each rising edge of the clock signal generated by the voltage controlled oscillator 102. The drivers 104 can each be one of six high-current field effect transistors which operate as switches to selectively couple each of the terminals φ1, φ2 and φ3, of the motor 100 to an appropriate positive voltage or negative voltage. The finite state machine 103 thus generates six control signals, each coupled to control one of the drivers 104.

A feedback signal 105 couples the finite state machine 103 to the phase detect circuit 101 so that the phase detect circuit 101 knows which of the three motor terminals φ1, φ2 or φ3, floats during the current drive state. The phase detect circuit 101 determines the position or phase of the rotor R as a function of the voltage waveform on the floating terminal. The coupling of the three motor terminals to the inputs of the phase detect circuit 101 completes the formation of a phase locked loop. The phase locked loop ensures that the finite state machine 103 transitions from each drive state to a next drive state at an appropriate time according to a position or phase of the rotor R.

The output of the phase detect circuit 101 which is representative of the actual speed of the motor 100 is also coupled to an inverting input of a transconductance amplifier 106. A non-inverting input of the transconductance amplifier 106 is coupled to receive a signal, Vspeed, that is representative of a desired speed of the motor. An output of the transconductance amplifier 106 is representative of a difference between the actual motor speed and the desired motor speed and is coupled to a capacitor 107 for forming a voltage across the capacitor 107. The voltage across the capacitor 107 is coupled to an input of a speed controller 108. The speed controller 108 generates a signal which is coupled to control the drivers 104. The signal from the speed controller 108 controls the speed of the motor 100 in a second feedback loop, by controlling the magnitude of the motor current.

Accordingly, the speed control loop controls the amount of current in the motor windings and, hence, its speed. The phase locked loop controls the timing of the current switching in the motor windings and, thus, monitors the motor speed rather than controls the motor speed. The speed control loop and the phase locked loop are, however, interdependent.

A problem with this prior art circuit is that if it is desired to operate the motor 100 at a slower speed than its current speed, the circuit simply stops driving the motor and the motor 100 coasts to the slower speed. This occurs because the speed control loop can only reduce the current in the motor windings to zero, creating zero torque. The amount of time it takes to coast depends upon the rotational inertia and friction of the motor and its load. Under some circumstances, the time it takes for the motor 100 to coast to a new desired speed may be undesirably long.

A possible solution to this problem is to short all the windings of the motor to ground by connecting each of the terminals φ1, φ2 and φ3, to ground. This decreases the time it takes to slow the motor. This approach, however, tends to result in high currents in the devices used to short the windings and, thus, may cause damage to these devices or may cause their premature failure. Additionally, connecting each of the three terminals to ground effectively discontinues feedback in the phase locked loop because there is then no floating motor terminal.

Therefore, what is needed is a control circuit for a brushless dc motor that can rapidly slow the motor when desired and that does not result in excessive current in a drive device.

SUMMARY OF THE INVENTION

The invention is a method and apparatus for driving a brushless dc motor including an active deceleration mode for rapidly slowing the motor. A circuit for driving the brushless dc motor includes a phase locked loop for sensing a phase of the motor and for commutating from a drive state to a next drive state in a sequence of drive states at an appropriate time for maintaining an induced torque on the rotor in a single angular direction in the direction of motor rotation. Thus, under normal conditions, the rotor "chases" the energized windings. The circuit for driving the brushless dc motor also includes a closed speed control loop for controlling the current in the windings of the motor by controlling a duty cycle or a magnitude of drive signals to the motor.

When the actual speed of the rotor exceeds the desired speed by more than a predetermined amount, rather than commutating to a next drive state in the sequence of drive states, an active deceleration circuit skips a commutation, while the circuit for driving the motor maintains the phase locked loop. By skipping one commutation, the current drive state is maintained while the rotor continues to turn due to its own inertia such that the rotor "passes up" this extended drive state. This results in a reverse torque induced on the rotor in a direction that is opposite the direction of motor rotation. When the phase locked loop indicates an appropriate time for commutating to a next drive state, the circuit transitions to the next drive state in the sequence of drive states. Because the rotor has passed the normally appropriate drive state for inducing forward torque, the current drive state continues to remain one commutation behind the normally appropriate drive state, maintaining the reverse torque. Thus, during active deceleration, the energized windings "chase" the rotor. Eventually, when the rotor slows sufficiently, the energized windings will "catch up" to the rotor such that the current drive state in the sequence of drive states will be an appropriate drive state for again inducing a forward torque on the rotor in the direction of rotation. Thus, when the motor has slowed sufficiently, it is not necessary to then skip a drive state, as the current drive state is the appropriate drive state for inducing forward torque.

Preferably, the actual speed of the motor must exceed the desired speed by a predetermined amount before a commutation is skipped. This prevents the circuit for driving the motor from unnecessarily activating the active deceleration circuit and, thus, causing inefficient operation. When the actual speed exceeds the desired speed by less than the predetermined amount, the motor coasts to the desired speed.

DETAILED DESCRIPTION OF THE PREFERRED EMBODIMENT

Figure 1:
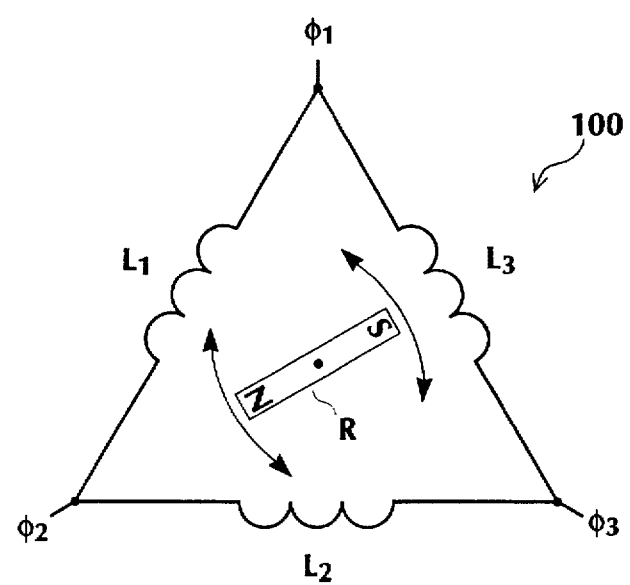
FIG. 1 illustrates a schematic diagram of a three-phase brushless dc motor.
Figure 2:
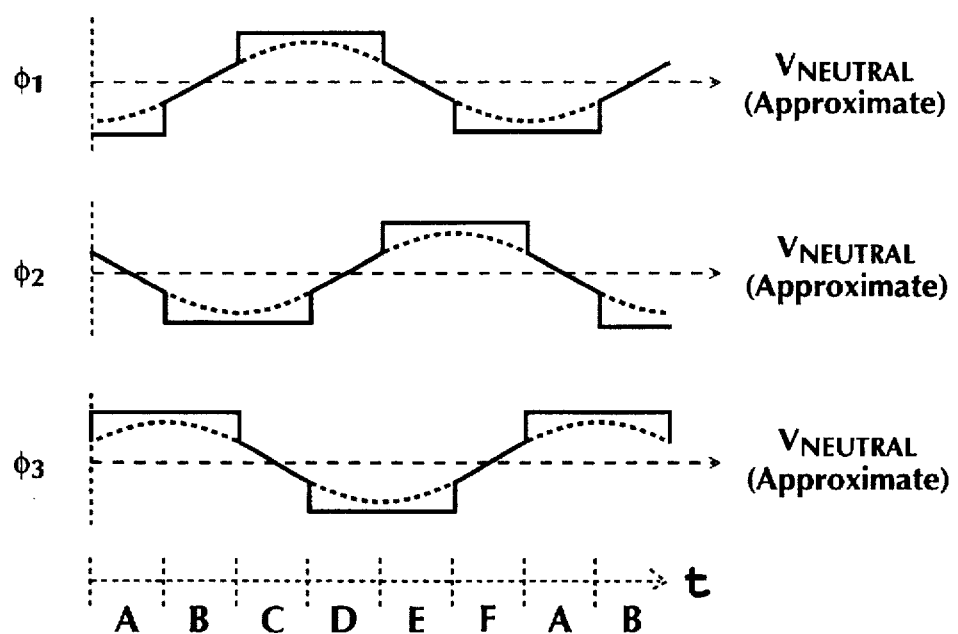
FIG. 2 illustrates waveforms for each of the three phases and corresponding drive states for the three-phase brushless dc motor shown in FIG. 1.
Figure 4:
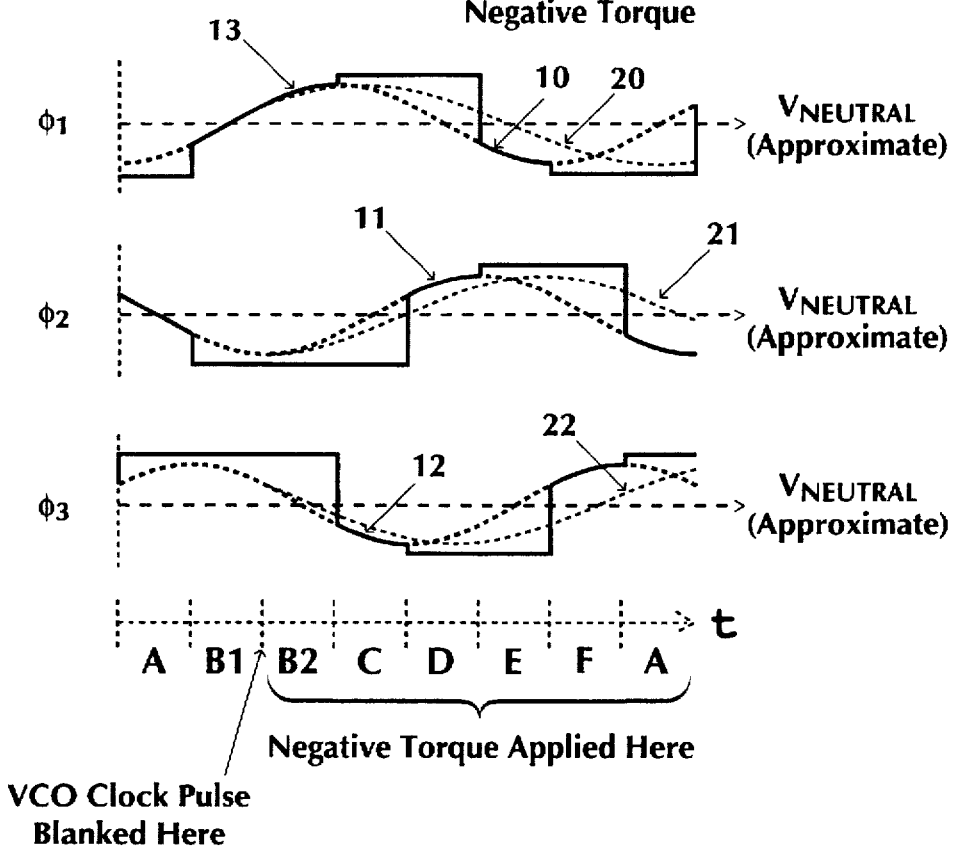
FIG. 4 illustrates waveforms for each of the three phases of a three-phase brushless dc motor and corresponding drive states, where a commutation has been skipped.

Waveforms for each of the three phases of a brushless dc motor and corresponding drive states where a commutation has been skipped according to the present invention, are illustrated in FIG. 4. Drive states A–F illustrated in FIG. 4 correspond to the drive states A–F illustrated in FIG. 2 and can be used to control the brushless dc motor 100 illustrated in FIG. 1. Referring to FIG. 4, in drive state A, a positive voltage is applied to the terminal $\phi 3$ of the motor 100 and a negative voltage is applied to the terminal $\phi 1$ of the motor 100, while the terminal $\phi 2$ of the motor 100 floats. In drive state B1, a positive voltage is applied to the $\phi 3$ terminal of the motor 100 and a negative voltage is applied to the $\phi 2$ terminal of the motor 100, while the $\phi 1$ terminal of the motor floats. During the drive states A and B1, the rotor R "chases" the magnetic fields created by the windings of the stator. This induces a torque on the rotor R in the direction of its rotation.

Then, to actively decelerate the motor 100 according to the present invention, at the end of the drive state B1, rather than transition directly to the drive state C, which is the next drive state in the sequence of drive states A–F, the signals applied to the terminals $\phi 1$, $\phi 2$ and $\phi 3$ during the drive state B1 are maintained, as illustrated in FIG. 4, during the drive state B2. During the drive state B2, the rotor R continues to turn while the drive signals are maintained. Thus, the rotor R "passes up" the magnetic field created by the windings of the stator. Concurrently, the frequency of the floating terminal waveform will slow to correspond with the slowing speed of the rotor R. Skipping one commutation while maintaining the motor drive currents induces a braking torque on the rotor R in a direction opposite the direction of its rotation. Then, in the drive state C, a positive voltage is applied to the $\phi 1$ terminal of the motor 100 and a negative voltage is applied to the $\phi 2$ terminal of the motor, while the $\phi 3$ terminal of the motor floats. Because in the drive state B2, the rotor R "passed up" the magnetic field of the stator, the magnetic field created in the drive state C, "chases" the rotor R and the induced torque continues to be in the direction opposite the direction of rotation. The magnetic fields created in the following drive states D, E, F, A, continue to "chase" the rotor R and the torque continues to be in a direction opposite rotation. Thus, the motor 100 is rapidly decelerated. It will be apparent to one of ordinary skill in the art that the duplicated drive state need not be state B. Indeed, any one of the six drive states A–F could be duplicated once to achieve the advantages of the present invention.

Waveforms 10, 11 and 12 in FIG. 4, illustrate that several drive states may be required to slow a motor having a relatively high inertia. In comparison, a motor having a lower inertia will slow faster, as illustrated in FIG. 4 by the waveforms 20, 21 and 22. The waveforms 20, 21 and 22 show the effect of applying a reverse torque because they have a longer period than do the corresponding waveforms 10, 11 and 12. In either case, as the motor 100 slows, the period of time for each drive state will correspondingly increase to correspond with the slowing speed of the rotor R. Eventually, when the motor 100 slows sufficiently, the energized windings will "catch up" to the rotor R such that the current drive state in the sequence of drive states will be an appropriate drive state for again inducing a forward torque on the rotor R in the direction of rotation. Thus, when the motor has slowed sufficiently, it is not necessary to then skip a drive state, as the current drive state is the appropriate drive state for inducing forward torque.

The waveforms illustrated in FIG. 4 are centered about a neutral voltage Vneutral. Vneutral is equivalent to the average of the three motor phase voltage waveforms. Therefore, Vneutral has a peak-to-peak amplitude that is approximately one-third of the peak-to-peak amplitude of each of the three motor phase voltages.

Figure 3:
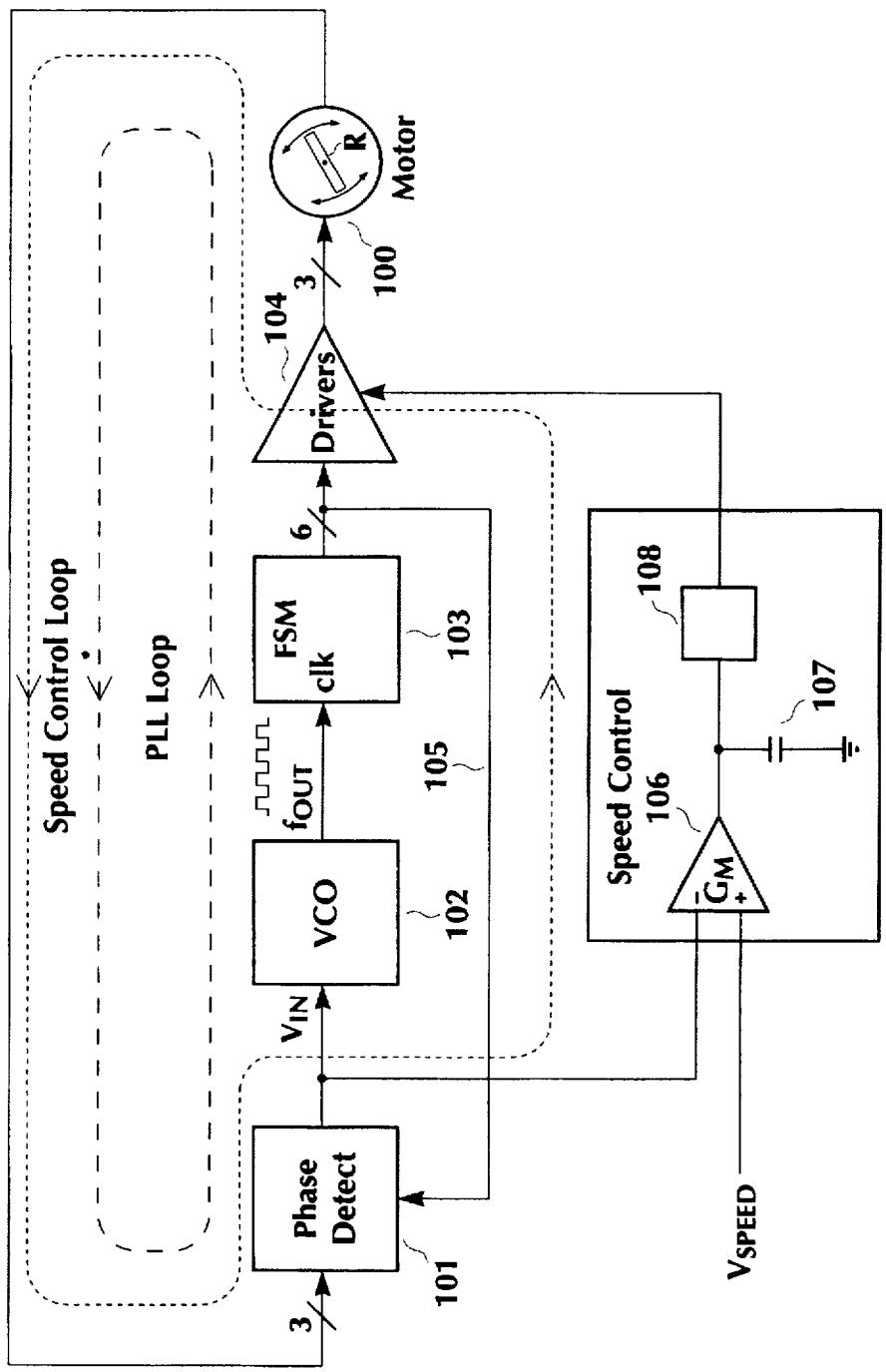
FIG. 3 illustrates a schematic block diagram of prior art circuit for driving a brushless dc motor.
Figure 5:
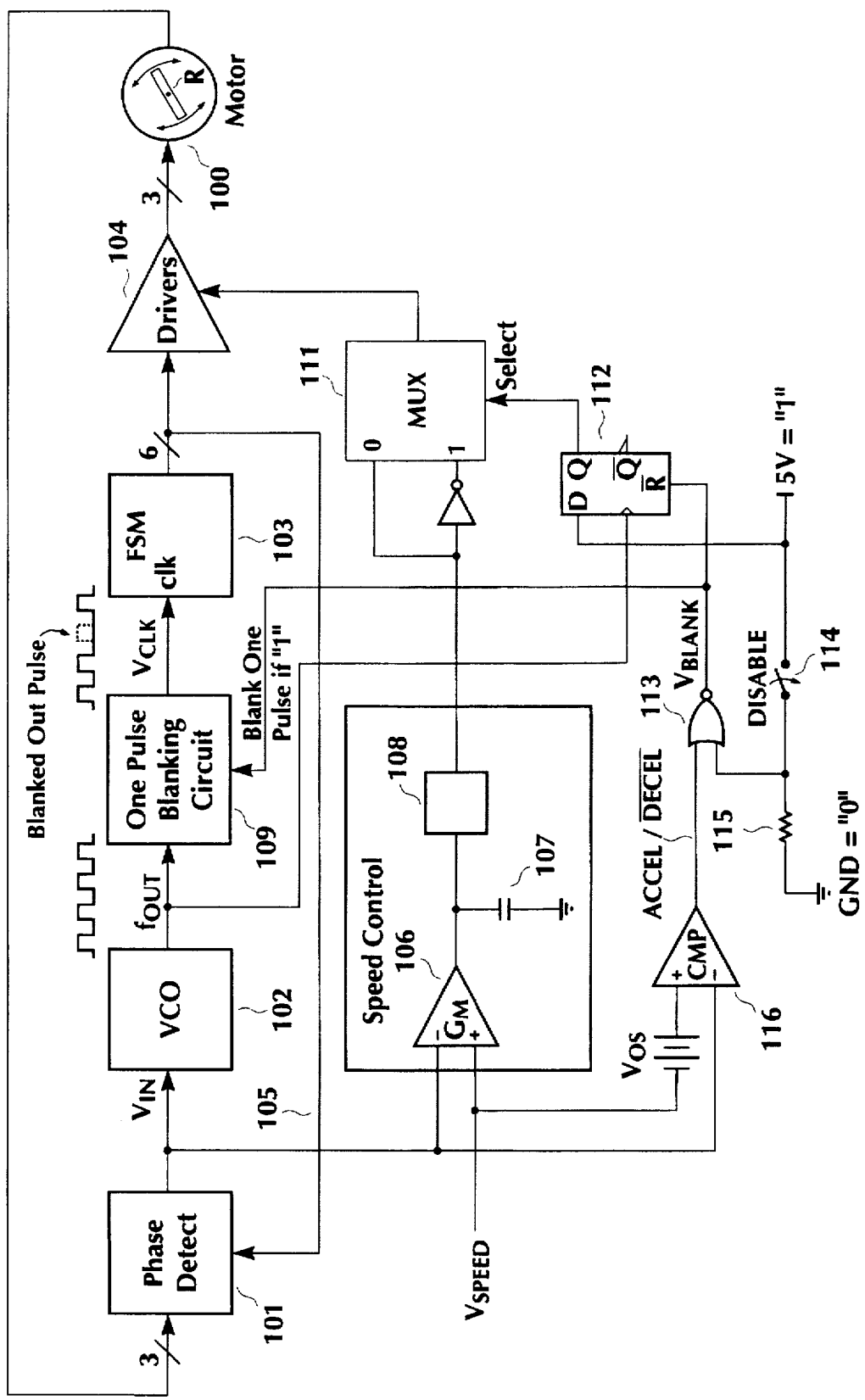
FIG. 5 illustrates a schematic block diagram of a circuit for driving the brushless dc motor including an active deceleration circuit for skipping a commutation.

FIG. 5 illustrates a schematic block diagram of a circuit for driving the brushless dc motor 100 including an active deceleration circuit for skipping a commutation as described above in reference to FIG. 4. The circuit shown in FIG. 5 is comparable to the circuit shown in FIG. 3, except that FIG. 5 includes additional elements 109–116, for actively decelerating the motor 100. Like reference numerals will be used in FIG. 5 for circuit elements that have a one-to-one functional correspondence to the elements of FIG. 3.

Referring to FIG. 5, phase detect circuit 101 senses a position or phase of the rotor R of the motor 100. The phase detect circuit 101 may sense the phase of the rotor R by utilizing photo sensors or Hall effect devices, but preferably senses the phase of the rotor R by sensing the induced voltage waveform on the floating motor terminal during each drive state. The induced voltage is caused by the rotation of the rotor R and is known as "back emf". By referring to FIG. 4, it can be seen that during drive state A, a positive voltage is applied to the $\phi 3$ terminal and a negative voltage is applied to the $\phi 1$ terminal, while the $\phi 2$ terminal is floating. A back emf voltage will be induced on the floating $\phi 2$ terminal, as illustrated by the waveform 11 during the drive state A. Therefore, the phase detect circuit 101 can sense this voltage to determine the position of the rotor R by integrating the back emf waveform with respect to the neutral voltage, Vneutral. During the drive state B1 and B2, because a positive voltage is applied to the $\phi 3$ terminal and a negative voltage is applied to the $\phi 2$ terminal, the back emf waveform 13 is sensed on the $\phi 1$ terminal. The phase detect circuit 101 receives each of the three motor phase voltages and selects the proper one (i.e. at the motor terminal not being driven) based upon the current state of the finite state machine 103. Thus, during each drive state, or during selected drive states, the induced back emf can be used to sense the position or phase of the rotor R.

The phase detect circuit 101 generates a voltage, Vin, that is representative of an actual speed of the motor 100 at its output. This signal is proportional to the frequency of the detected back emf waveforms and is input to a voltage controlled oscillator 102 which generates a clock signal, fout. The frequency of the clock signal, fout, is based upon the level of the voltage generated by the phase detect circuit 101. A one pulse blanker circuit 109 receives the clock signal, fout, and inhibits, or blanks out, selected pulses, forming a signal, Vclk. The pulses will only be blanked out according to the conditions described below. A finite state machine 103 receives the signal, Vclk, from the one pulse blanker circuit 109 and generates control signals for each of the six drive states A–F for controlling drivers 104.

The finite state machine 103 transitions from one of the six drive states A–F to a next drive state at each rising edge of the signal, Vclk, generated by the voltage controlled oscillator 102. If a pulse is blanked by the one pulse blanker circuit 109, the finite state machine 103 will not transition to a next drive state. Thus, when a pulse is blanked, the finite state machine 103 will skip a commutation by maintaining a current drive state while the rotor R "passes up" the magnetic field induced by the current drive state before the finite state machine 103 transitions to a next drive state. As explained above in reference to FIG. 4, a continuous decelerating torque is induced on the rotor R by skipping a commutation.

The drivers 104 can be six high-current field effect transistors which operate as switches to selectively couple each of the terminals φ1, φ2 and φ3, of the motor 100 to a positive voltage or to a negative voltage (or to ground). The finite state machine 103 thus generates six control signals, each coupled to control a gate of one of the drivers 104.

A feedback signal 105 couples the finite state machine 103 to the phase detect circuit 101 so that the phase detect circuit 101 knows which of the three motor terminals floats during the current drive state. The phase detect circuit 101 determines the position or phase of the rotor R as a function of the voltage waveform seen on this floating terminal. The coupling of the three motor terminals to the inputs of the phase detect circuit 101 completes the formation of a phase locked loop. The phase locked loop ensures that the finite state machine 103 transitions from each drive state to a next drive state at an appropriate time according to a position or phase of the rotor R.

The output of the phase detect circuit 101 which is representative of the actual speed of the motor 100 is coupled to an inverting input of a transconductance amplifier 106. A non-inverting input of the transconductance amplifier 106 is coupled to receive a signal, Vspeed, that is representative of a desired speed of the motor. An output of the transconductance amplifier 106 is representative of a difference between the actual motor speed and the desired motor speed and is coupled to a capacitor 107 for forming a voltage across the capacitor 107. The voltage across the capacitor 107 is coupled to an input of a speed controller 108. The speed controller 108 generates a control signal which is coupled to a first input of a multiplexer 111 and to an input of an inverter 110. An output of the inverter is coupled to a second input of the multiplexer 111.

A control signal output from the multiplexer 111 is gated with the signals from the finite state machine 103 for controlling the drivers 104. The motor speed is controlled through pulse width modulation or by linear control of the drivers 104. In the case of pulse width modulation, the duty cycle of the drive signals can vary from 0% (the motor coasts) to 100% (maximum torque). When the speed control loop is closed with the inputs to the transconductance amplifier being equal, the resultant duty cycle is approximately 50%, depending upon the inertia of the motor 100. A high motor inertia results in a lower duty cycle (e.g. 10%), whereas, a low motor inertia results in a higher duty cycle. In the case of linear control, the magnitude of the drive signals are controlled by the speed controller 108 over a minimum to maximum range of dc voltage.

When the first signal to the multiplexer 111 is selected to control the drivers, the torque induced on the rotor R is in the forward direction and, hence, the speed of the motor 100, is controlled with negative feedback in a feedback loop. When the actual speed of the motor exceeds the desired speed of the motor, the output signal from the transconductance amplifier 106, and, hence, the output signal from the speed controller 108, will change polarity to decelerate the motor 100. When the motor 100 is coasting, the current in the windings L1, L2 and L3 drops to zero, whereas, when actively decelerating the motor 100, the current in the windings L1, L2 and L3 is in the same direction as when accelerating the motor 100. Thus, the multiplexer 111 is needed to invert the polarity of the output signal from the speed controller 108 during active deceleration. Therefore, by inverting the output signal from the speed controller 108 when actively decelerating the motor 100, the torque induced on the rotor R is also controlled with negative feedback in a feedback loop.

The output of the phase detect circuit 101 is also coupled to an inverting input of a comparator 116. A non-inverting input of the comparator 116 is coupled to receive the voltage, Vspeed, though offset by a voltage Vos. Thus, the output of the comparator 116 will change when the actual speed of the motor 100 exceeds the desired speed by a predetermined amount. This avoids having the circuit actively decelerate the motor when the desired speed is exceeded by only a nominal amount. The predetermined amount is adjustable by adjusting the offset voltage, Vos. When the actual speed exceeds the desired speed by less than the predetermined amount, the motor 100 coasts to the desired speed.

The output of the comparator 116 indicates whether or not the circuit is to actively decelerate the motor 100 and is coupled to a first input to a logic NOR gate 113. A second input of the NOR gate 111 is coupled to a first terminal of a switch 114 and to a first terminal of a resistor 115. A second terminal of the switch 114 is coupled to a logical high voltage. A second terminal of the resistor 115 is coupled to a logical low voltage. When the switch 114 is closed, active deceleration of the motor 100 will be prevented and the circuit illustrated in FIG. 5 will function similarly to the circuit illustrated in FIG. 3.

An output of the NOR gate 113 is coupled to selectively activate the one pulse blanker circuit 109 and is coupled to an active-low reset input R of a D-type flip-flop 112. A clock input CLK of the flip-flop 112 is coupled to receive the clock signal, fout, from the output of the voltage controlled oscillator 102. A data input D of the flip-flop 112 is coupled to a logical high voltage. A Q output of the flip-flop 112 is coupled to a select input of the multiplexer 111.

When the comparator 116 determines that the voltage, Vin, representative of the actual speed of the motor 100, exceeds a voltage, Vspeed, representative of the desired speed, by more than the predetermined amount, Vos, it triggers the flip-flop 112. The flip-flop 112, in turn, instructs the multiplexer 11 1 to invert the polarity of the output of the speed controller 108 beginning with the upcoming blanking of the commutation pulse, coincident with the next rising edge of the signal, fout, for controlling the deceleration of the motor in a feedback loop, as explained above. Therefore, the flip-flop 112 synchronizes the inversion of the polarity of the signal from the speed controller 108 with the blanking of a pulse from the clock signal, Vclk.

It will be apparent that an ability to reverse the motor 100 could be included in the circuit of FIG. 5. Reversing the direction of the motor can be accomplished by adding a control input to the finite state machine 103 for reversing the sequence of the drive states A–F. Thus, rather than commutating drive states in the order A, B, C, D, E, F, A, . . . the order would instead be reversed to F, E, D, C, B, A, F, . . . . Reversing the order of drive states is in contrast to skipping a commutation as in active deceleration. Including an ability to reverse the motor 100, in combination with active deceleration in the forward and reverse directions, provides increased flexibility in controlling the motor 100.

Figure 6:
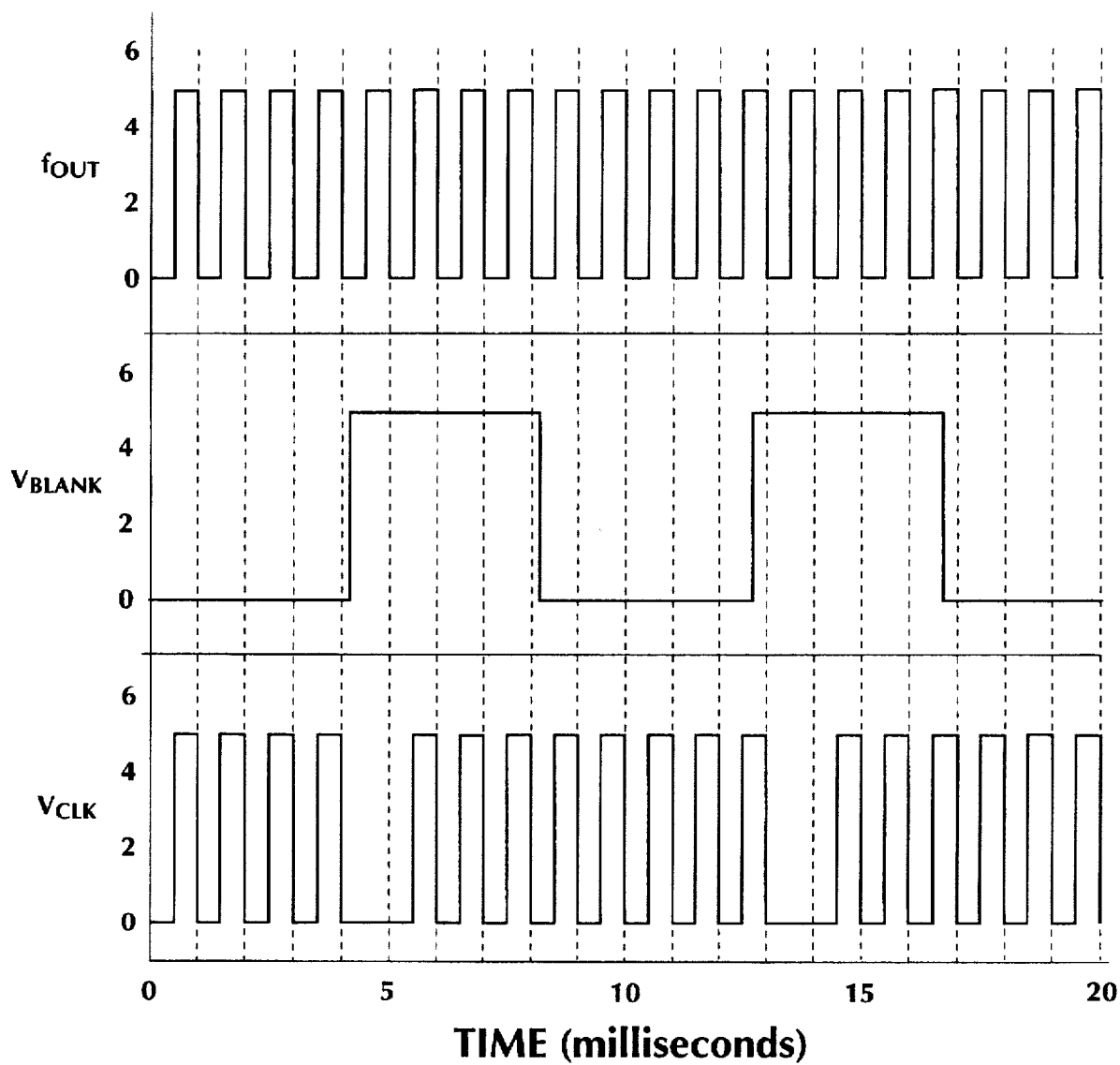
FIG. 6 illustrates a timing diagram for the signals associated with the one pulse blanker circuit illustrated in FIG. 5.

FIG. 6 illustrates a timing diagram for the signals associated with the one pulse blanker circuit 109 illustrated in FIG. 5. The signal, fout, is the clock signal generated by the voltage controlled oscillator 102. The signal, Vblank, is the signal from the output of the NOR gate 113 which is input to the one pulse blanker circuit 109. The signal, Vclk, is the clock signal with one pulse blanked generated by the one pulse blanker circuit 109 which is coupled to the clock input, CLK, of the finite state machine 103. As can be seen by the signal, Vclk, from FIG. 5, only one pulse of the signal, fout, is blanked for each occurrence that the signal, Vblank, is a logical high voltage, as occurs when the actual speed of the motor 100 exceeds the desired speed by more than the predetermined amount.

Figure 7:
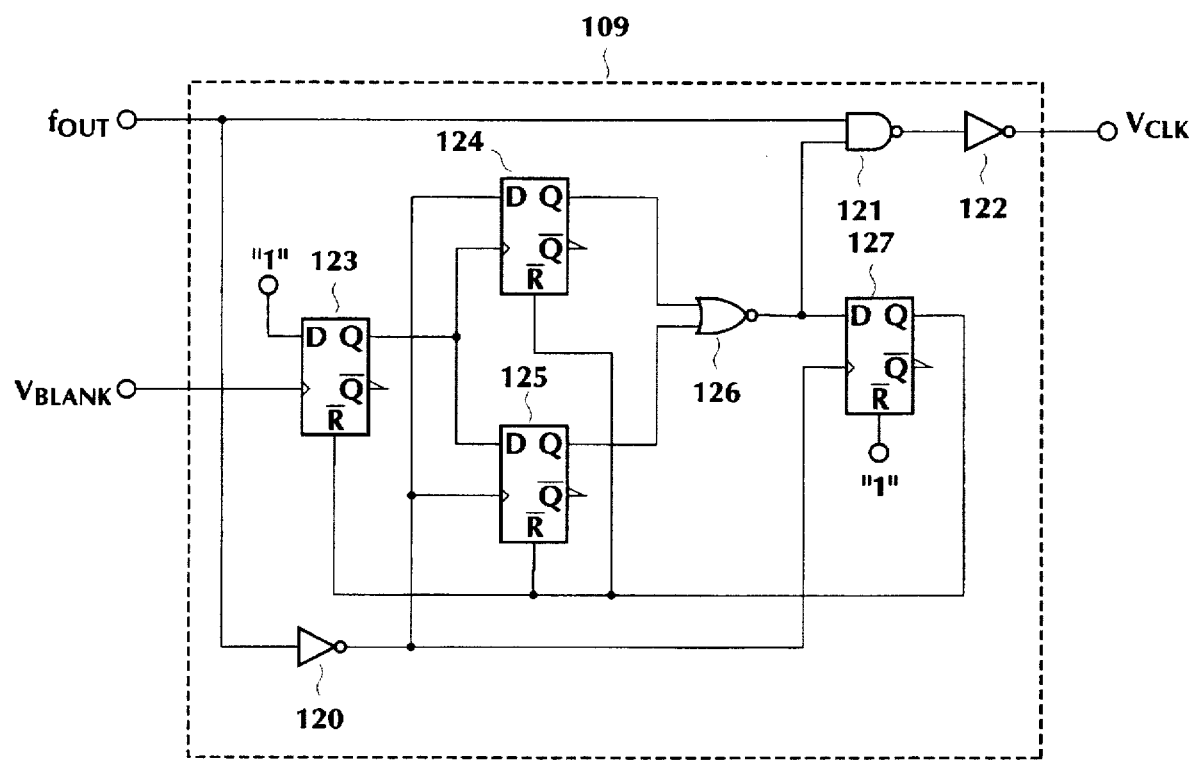
FIG. 7 illustrates a detailed block diagram of the one pulse blanker circuit for which the associated signals are illustrated in FIG. 6.

FIG. 7 illustrates a detailed block diagram of the one pulse blanker circuit 109 for which the associated signals, fout, Vblank and Vclk, are illustrated in FIG. 6. The signal fout is coupled to an input of an inverter 120 and to a first input of a logic NAND gate 121. An output of the NAND gate 121 is coupled to an input of an inverter 122. An output of the inverter 122 generates the signal, Vclk. The signal, Vblank, is coupled to a CLK input to a D-type flip-flop 123. A logical high voltage is coupled to a data input D of the flip-flop 123. A Q output of the flip-flop 123 is coupled to a clock input CLK of a D-type flip-flop 124 and to a data input D of a D-type flip-flop 125.

A Q output of the flip-flop 124 is coupled to a first input of a logic NOR gate 126. A Q output of the flip-flop 125 is coupled to a second input of the logic NOR gate 126. An output of the logic NOR gate 126 is coupled to a data input D of a flip-flop 127 and to a second input of the NAND gate 121. An output of the inverter 120 is coupled to a data input D of the flip-flip 124, to a clock input CLK of the flip-flop 125 and to a clock input CLK of the flip-flop 127. A Q output of the flip-flop 127 is coupled to an active-low reset input $\overline{R}$ of the flip-flop 123, to an active-low reset input $\overline{R}$ of the flip-flop 124 and to an active-low reset input $\overline{R}$ of the flip-flop 125. An active-low reset input $\overline{R}$ of the flip-flop 127 is coupled to a logical high voltage.

Referring to FIG. 7, when the signal Vblank is logical low voltage, the signal, fout, passes through to Vclk. When the signal, Vblank, makes a transition from a logical low voltage to a logical high voltage, the pulse beginning with the next rising edge of the signal, fout, is blanked from the signal, Vclk. One clock pulse is blanked regardless of the level of the signal, fout, during a transition from a logical low voltage to a logical high voltage of the signal, Vblank, and regardless of the duration that the signal, Vblank, is a logical high voltage.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A method of driving a brushless dc motor comprising the steps of:
    a. sensing a phase of a rotor of the motor;
    b. applying current to windings of the motor according to a sequence of drive states for inducing a continuous torque on the rotor in a first direction of rotation of the rotor wherein each commutation from a current drive state to a next drive state occurs according to the phase of the rotor; and
    c. skipping one commutation whereby a torque is induced on the rotor in a direction opposite the first direction.

2. The method according to claim 1 wherein the step of sensing a phase of the rotor is performed by a phase locked loop.

3. The method according to claim 2 further comprising the step of sensing an actual speed of the rotor.

4. The method according to claim 3 wherein the step of skipping one commutation is performed after determining that the actual speed of the rotor exceeds a desired speed for the rotor.

5. The method according to claim 1 further comprising the step of reversing the sequence of drive states for rotating the rotor in a direction opposite the first direction.

6. The method according to claim 1 further comprising a step of controlling a level of the current in the windings in a feedback loop wherein a polarity of a feedback signal is reversed when the one commutation is skipped.

7. The method according to claim 1 wherein when the torque is induced on the rotor in a direction opposite the first direction, the current in the windings is in a same direction as when inducing the torque on the rotor in a first direction.

8. A circuit for driving a brushless dc motor, the circuit comprising:
    a. a phase locked loop for commutating to a next drive state in a sequence of drive states wherein a torque on a rotor of the motor is maintained in a direction of rotation;
    b. a speed control loop coupled to the phase locked loop for sensing a speed of the rotor for controlling a level of the torque; and
    c. a deceleration circuit coupled to the speed control loop for skipping exactly one commutation wherein the torque on the rotor is maintained in a direction opposite rotation after the speed of the rotor exceeds a desired speed.

9. The circuit according to claim 8 wherein each drive state in the sequence of drive states corresponds to a state of a finite state machine.

10. The circuit according to claim 8 wherein the finite state machine is coupled to control the presence and direction of current in windings of the motor.

11. The circuit according to claim 10 wherein a level of torque is controlled by a level of current in the windings.

12. The circuit according to claim 8 wherein the phase locked loop includes means for reversing the order of the sequence of drive states for reversing the direction of rotation.

13. The circuit according to claim 8 wherein the commutation is skipped when the speed of the rotor exceeds the desired speed by more than a predetermined amount.

14. The circuit according to claim 13 wherein the rotor coasts when the speed of the rotor exceeds the desired speed by less than the predetermined amount.

15. The circuit according to claim 8 wherein the speed control loop comprises means for reversing a polarity of a feedback signal when the commutation is skipped.

16. The circuit according to claim 15 wherein the speed control loop further comprises means for ensuring that the time at which the polarity of the feedback signal is reversed coincides with the time at which the commutation is skipped.

17. A circuit for driving a brushless dc motor, the circuit comprising:
    a. means for sensing a rotational speed of the motor;
    b. means for forming a clock signal having a frequency related to the rotational speed wherein the means for forming is coupled to the means for sensing;

c. means for commutating from a drive state to a next drive state in a sequence of drive states wherein each commutation corresponds to one pulse of the clock signal wherein the means for commutating is coupled to the means for forming; and d. means for blanking exactly one pulse of the clock signal when the rotational speed exceeds a desired speed by a predetermined amount wherein the means for blanking is coupled to the means for commutating.

18. The circuit according to claim 17 wherein the means for commutating comprises a finite state machine wherein the finite state machine is clocked through its states by the clock signal.

19. The circuit according to claim 18 wherein the finite state machine comprises means for reversing an order of the sequence of drive states.

20. The circuit according to claim 17 wherein the means for sensing a rotational speed of the motor senses a back emf induced across a winding of the motor.

21. The circuit according to claim 17 wherein the means for blanking comprises a one pulse blanking circuit having a first input, a second input and an output, wherein the clock signal is coupled to the first input, a signal applied to the second input has a first logic value when the rotational speed does not exceed the desired speed by the predetermined amount and a second logic value when the rotational speed does exceed the desired speed by the predetermined amount and wherein the output provides the clock signal except that when the second input transitions from the first logic value to the second logic value, one pulse of the clock signal is blanked.

22. A method of driving a brushless dc motor comprising the steps of:

a. sensing a phase of a rotor of the motor;

b. applying current to windings of the motor according to a sequence of drive states for inducing a torque on the rotor in a first direction of rotation of the rotor wherein each commutation from a current drive state to a next drive state occurs according to the phase of the rotor; and c. skipping one commutation whereby the phase of the rotor passes up the sequence of drive states and a torque is induced on the rotor in a direction opposite the first direction.

23. The method according to claim 22 further comprising a step of controlling a level of the current in the windings in a feedback loop wherein a polarity of a feedback signal is reversed when the one commutation is skipped.

24. The method according to claim 22 wherein when the torque is induced on the rotor in a direction opposite the first direction, the current in the windings is in a same direction as when inducing the torque on the rotor in the first direction.

25. A method of driving a brushless dc motor comprising the steps of:

a. sensing a phase of a rotor of the motor;

b. applying current to windings of the motor according to a sequence of drive states for inducing a torque on the rotor in a first direction of rotation of the rotor wherein each commutation from a current drive state to a next drive state occurs according to the phase of the rotor; and c. skipping a commutation whereby a torque is induced on the rotor in a direction opposite the first direction and wherein when the torque is induced on the rotor in a direction opposite the first direction, the current in the windings is in a same direction as when inducing the torque on the rotor in the first direction.

26. The method according to claim 25 further comprising a step of controlling a level of the current in the windings in a feedback loop wherein a polarity of a feedback signal is reversed when the commutation is skipped.

27. A circuit for driving a brushless dc motor, the circuit comprising:

a. means for sensing a rotational speed of the motor;

b. means for forming a clock signal having a frequency related to the rotational speed wherein the means for forming is coupled to the means for sensing;

c. means for commutating from a drive state to a next drive state in a sequence of drive states wherein each commutation corresponds to one pulse of the clock signal wherein the means for commutating is coupled to the means for forming; and d. means for blanking a pulse of the clock signal when the rotational speed exceeds a desired speed by a predetermined amount wherein the means for blanking is coupled to the means for commutating, wherein the means for blanking comprises a one pulse blanking circuit having a first input, a second input and an output, wherein the clock signal is coupled to the first input, a signal applied to the second input has a first logic value when the rotational speed does not exceed the desired speed by the predetermined amount and a second logic value when the rotational speed does exceed the desired speed by the predetermined amount and wherein the output provides the clock signal except that when the second input transitions from the first logic value to the second logic value, one pulse of the clock signal is blanked.

* * * * *

UNITED STATES PATENT AND TRADEMARK OFFICE
CERTIFICATE OF CORRECTION

PATENT NO. : 5,793,168

DATED : August 11, 1998

INVENTOR(S) : Mark Vitunic

It is certified that error appears in the above-identified patent and that said Letters Patent is hereby correct as shown below:

In column 4, line 12, delete "de motor" and insert --dc motor--.

In column 8, line 34, delete "input R" and insert --input $\overline{R}$--.

In column 8, line 46, delete "multiplexer 11 1" and insert --multiplexer 111--.

IN THE CLAIMS

In column 10, line 39, delete "according to claim 8" and insert --according to claim 9--.

Signed and Sealed this

Thirteenth Day of October 1998

Attest:

BRUCE LEHMAN

Attesting Officer

Commissioner of Patents and Trademarks